(12) United States Patent
Hansl (10) Patent No.: US 10,358,288 B2
(45) Date of Patent: Jul. 23, 2019

(54) STORAGE SYSTEM

(71) Applicant: Rudolf Hansl, Linz (AT)

(72) Inventor: Rudolf Hansl, Linz (AT)

(*) Notice: Subject to any disclaimer, the term of this patent is extended or adjusted under 35 U.S.C. 154(b) by 0 days.

(21) Appl. No.: 15/319,671

(22) PCT Filed: Jun. 16, 2015

(86) PCT No.: PCT/EP2015/063499
§ 371 (c)(1),
(2) Date: Dec. 16, 2016

(87) PCT Pub. No.: WO2015/193330
PCT Pub. Date: Dec. 23, 2015

(65) Prior Publication Data
US 2017/0121111 A1    May 4, 2017

(30) Foreign Application Priority Data

Jun. 16, 2014 (DE) .................. 10 2014 108 453

(51) Int. Cl.
*B65G 1/04* (2006.01)
*B65G 1/06* (2006.01)
*B65G 1/137* (2006.01)

(52) U.S. Cl.
CPC .............. *B65G 1/0492* (2013.01); *B65G 1/06* (2013.01); *B65G 1/137* (2013.01); *B65G 1/1373* (2013.01)

(58) Field of Classification Search
CPC ..... B65G 1/0492; B65G 1/137; B65G 1/1373
See application file for complete search history.

(56) References Cited

U.S. PATENT DOCUMENTS

| | | | |
|---|---|---|---|
| 6,805,526 B2 * | 10/2004 | Stefani ............... | B65G 1/04 414/278 |
| 7,381,022 B1 * | 6/2008 | King .................. | B65G 1/0492 187/270 |
| 7,591,630 B2 * | 9/2009 | Lert, Jr. ............. | B65G 1/0492 414/807 |
| 7,861,844 B2 * | 1/2011 | Hayduchok ......... | B07C 3/087 198/370.1 |
| 7,918,314 B2 * | 4/2011 | Korchagin .......... | B65G 1/0407 182/82 |

(Continued)

FOREIGN PATENT DOCUMENTS

| | | |
|---|---|---|
| DE | 2114705 A1 | 10/1971 |
| DE | 19848274 A1 | 5/2000 |

(Continued)

*Primary Examiner* — Kaitlin S Joerger (74) *Attorney, Agent, or Firm* — Loginov & Associates, PLLC; William A. Loginov (57) ABSTRACT

The invention relates to a storage system which comprises at least one station, such as a goods input station, a goods relocation station, a goods picking station, or a goods removal station, and a storage shelf, which has a plurality of storage places for storing goods, which storage places are arranged adjacent to each other and/or one over the other. The storage system also comprises at least one goods transport vehicle, which transports at least one good from the station to the storage place or vice versa, and the transport occurs without the good being transferred onto another goods transport vehicle or another means of transport.

14 Claims, 4 Drawing Sheets

(56) References Cited

U.S. PATENT DOCUMENTS

| | | | | |
|---|---|---|---|---|
| 7,931,431 | B2* | 4/2011 | Benedict | B63B 25/22 |
| | | | | 280/755 |
| 7,991,505 | B2* | 8/2011 | Lert, Jr. | B65G 1/0492 |
| | | | | 198/347.1 |
| 8,104,601 | B2* | 1/2012 | Hayduchok | B07C 3/087 |
| | | | | 198/347.1 |
| 8,622,194 | B2* | 1/2014 | DeWitt | B07C 3/087 |
| | | | | 198/347.1 |
| 9,010,517 | B2* | 4/2015 | Hayduchok | B07C 3/087 |
| | | | | 198/347.1 |
| 9,334,113 | B2* | 5/2016 | Naylor | B65G 1/065 |
| 9,409,709 | B2* | 8/2016 | Keating | B65G 1/02 |
| 9,815,625 | B2* | 11/2017 | DeWitt | B65G 1/0421 |
| 2008/0269960 | A1* | 10/2008 | Kostmann | B65G 1/0407 |
| | | | | 701/2 |
| 2009/0074545 | A1 | 3/2009 | Lert, Jr. et al. | |
| 2015/0336741 | A1* | 11/2015 | Ahammer | B65G 1/0485 |
| | | | | 414/281 |
| 2016/0355339 | A1* | 12/2016 | Peng | B65G 1/0457 |
| 2017/0101263 | A1* | 4/2017 | Schroer | B65G 1/0407 |
| 2017/0137222 | A1* | 5/2017 | Lert, Jr. | B65G 1/0492 |
| 2018/0037410 | A1* | 2/2018 | DeWitt | B65G 1/0492 |

FOREIGN PATENT DOCUMENTS

| | | |
|---|---|---|
| DE | 102010015054 A1 | 11/2011 |
| EP | 0100867 A1 | 2/1984 |
| EP | 2436618 A2 | 4/2012 |
| WO | 2005118436 A1 | 12/2005 |

\* cited by examiner

STORAGE SYSTEM

FIELD OF THE INVENTION

The invention relates to a storage system, which comprises at least one station, such as a goods input station, a goods relocation station, a goods picking station, or a goods removal station, and a storage shelf, which has a plurality of storage places for storing goods, which storage places are arranged adjacent to each other and/or one over the other, the transport system comprising at least one goods transport vehicle.

BACKGROUND OF THE INVENTION

In past years, the generic storage systems have developed from simple warehouses with high labor costs for preparing and picking the goods stored on the storage shelf to highly complex, largely automated storage systems in which a storage shelf is connected to a station via a chain of different conveying systems, such as for instance a shelf storage and retrieval device, an industrial truck, and transport systems such as for instance roller conveyors or conveyor belts.

During the course of dynamic developments in E-commerce, the challenges to efficiency in the field of picking and the number of articles per order increased significantly in the generic storage systems, which is why the known storage systems very rapidly reach the limits of their efficiency with respect to the transport of goods and then become inefficient. This lack of flexibility in the known storage systems with respect to work peaks goes hand in hand with great technical complexity for the various conveyance systems, their coordination and the associated costs, and the resultant limited cost efficiency.

SUMMARY

It is therefore the object of the present invention to suggest a storage system that has better efficiency.

For attaining this object, the invention proceeds from a storage system as described in the foregoing that is distinguished in that at least one good is transported from the station to the storage place or vice versa and the transport occurs without the good being transferred onto another goods transport vehicle or another transport means, station and storage shelf being arranged adjacent to one another and the goods transport vehicle for the transport of the good moving both in particular in the essentially horizontally oriented region between the station and the storage shelf, and in the storage shelf, here especially also diagonally or vertically, and the goods transport vehicle being equipped with a conveying means, such as for instance a conveyor belt or roller conveyor that may be driven by a drive, for delivering or removing the good provided or providable on the goods transport vehicle, and the good remaining on the conveying means during the transport, and a conveying means, such as for instance a conveyor belt or a roller conveyor being provided at at least one storage place of the storage shelf or of a station, and the goods transport vehicle being equipped with an energy output means or overdrive, for instance a plug, a driven shaft, or a driven gear or output drive gear, that may be mechanically connected to an energy connection point on the conveying means of the storage place or of the station, and that may be driven especially with the drive or the energy source of the conveying means of the goods transport vehicle.

The primary advantage of the inventive suggestion derives from the fact that the inventive approach intentionally does not use a plurality of different transport systems, as is known in the prior art, and transports the good(s) with only one genre of transport means, the described goods transport vehicles. Since the entire transport task is conducted using one autarkic transport system, the described goods transport vehicles, during operation no complex coordination between the individual transport systems or transport genres is necessary.

Another main aspect of the suggested inventive solution is that there is intentionally no use of a complex lifting device at the storage place or station and there is intentionally no use of a shelf access device in the storage shelf. As described, the goods transport vehicles are equipped with an energy output means or overdrive, and drive the conveying means provided at the storage place or station, either using their own drive (if equipped with a coupling) or using the energy source (for instance, a battery) that is carried with the goods transport vehicle. In the first place, such a simply equipped storage shelf is simple to expand and in particular is also scalable in terms of its efficiency, and, secondly, there is also no need for the sensitive technology in the lift devices that are known in storage shelves and that place the good into or remove the good from the storage place or station. The invention in particular provides that the maintenance-relevant elements are arranged on the goods transport vehicles that regularly travel back and forth between the stations and the storage shelf and may then be removed for maintenance as needed (these have on-board diagnostic systems, for instance).

An additional advantage of the inventive suggestion is that it saves space, since there is no need for the handling spaces between the individual transport systems that are necessary in the prior art.

In addition, there is a time savings, i.e., transport is ultimately faster, and the storage system according to the invention is therefore also more efficient, because there is no transfer of the goods between different transport systems.

The use of the suggested goods transport vehicles according to the invention as (the sole) transport genre renders the inventive storage system highly flexible and thus also effective. Ultimately only one guidance system (which may be embodied as desired) that ensures that the goods transport vehicle travels from the station to the storage places (and back) is required for operation, that is, the travel by the goods transport vehicles. In particular, the storage shelf provided with the inventive storage system is embodied such that the goods transport vehicle may also move therein, which is attained by appropriately configuring the storage shelf (inclined transport segments or transport segments running vertically).

The suggestion according to the invention combines a technically effective solution with high commercial efficiency.

Since, according to the inventive approach, a (plurality) of goods transport vehicles is used in which transferring the goods between station and storage place is not necessary, it is possible to enlarge such a storage system simply and flexibly. When the storage system is enlarged, naturally first the storage surface area, that is the storage shelf, is enlarged. This is accompanied by an enlargement of the transport segments for the goods transport vehicles, since the goods transport vehicle may approach each storage place. Finally, only the guidance system must additionally be adapted.

This becomes especially clear if the result of enlarging a storage system (that is, the storage shelf) according to the prior art (in which, e.g., a shelf storage and retrieval device is used) is compared to the suggestion according to the invention.

DETAILED DESCRIPTION

Figure 1:
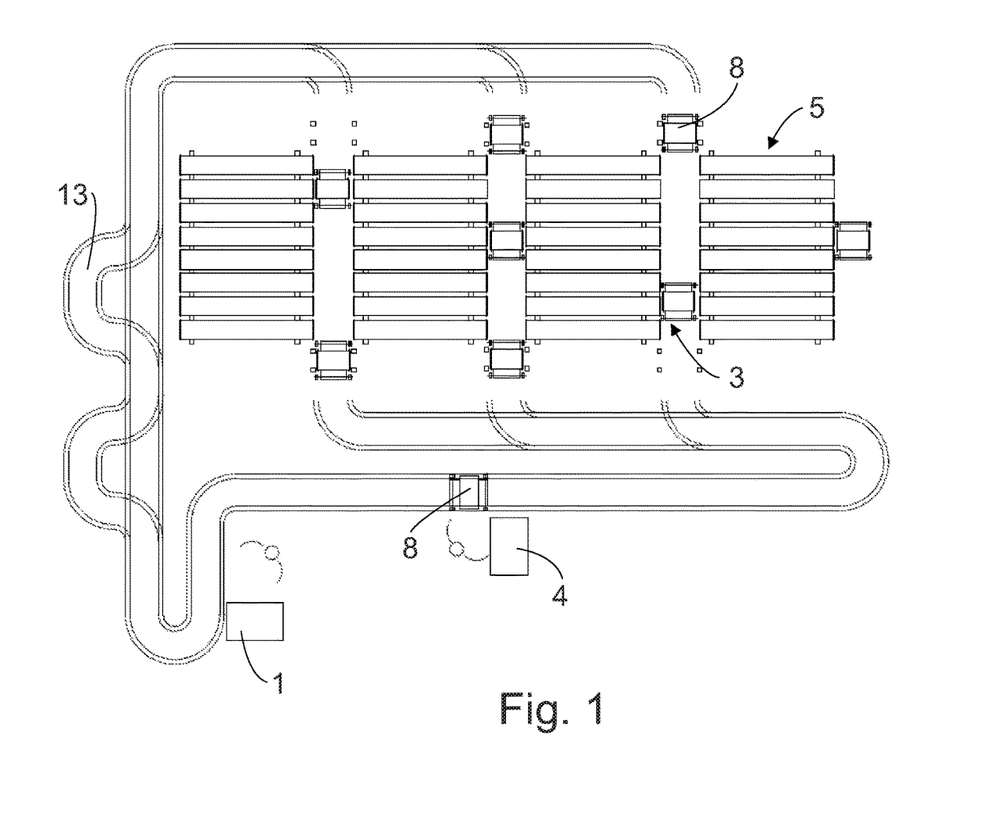
FIG. 1 shows a top view of a storage system in total.
Figure 2:
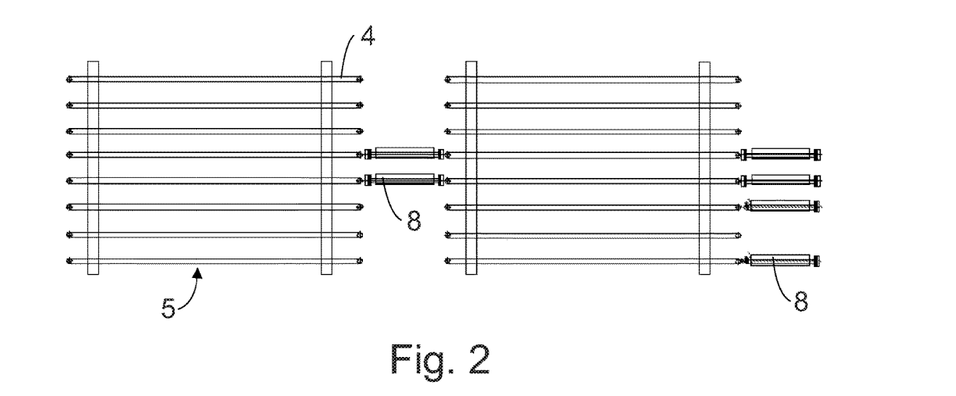
FIG. 2 illustrates a side view of a storage shelf with several transport vehicles.
Figure 3:
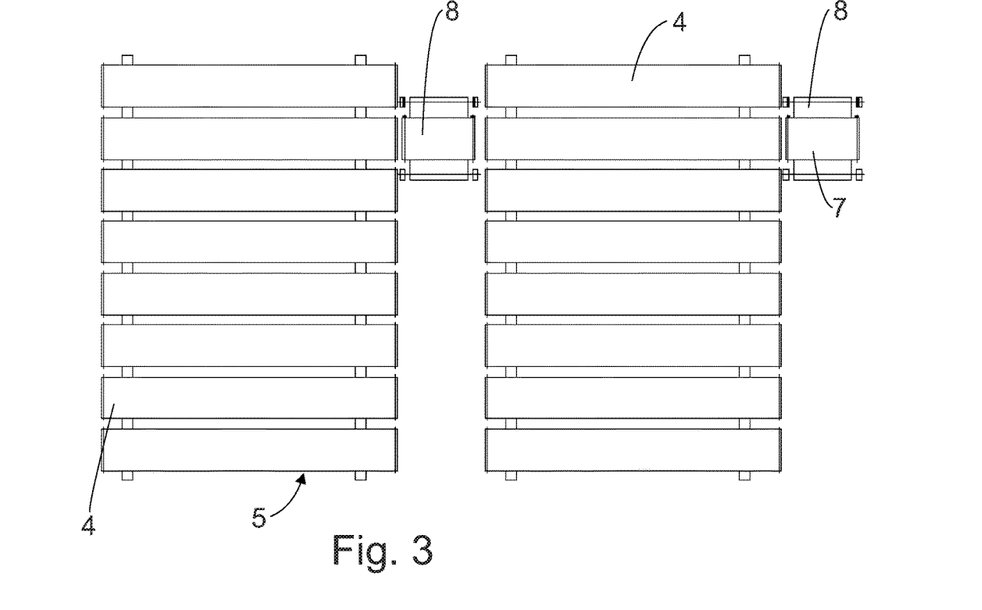
FIG. 3 shows a top view of the storage shelf with transport vehicles of FIG. 2.
Figure 4:
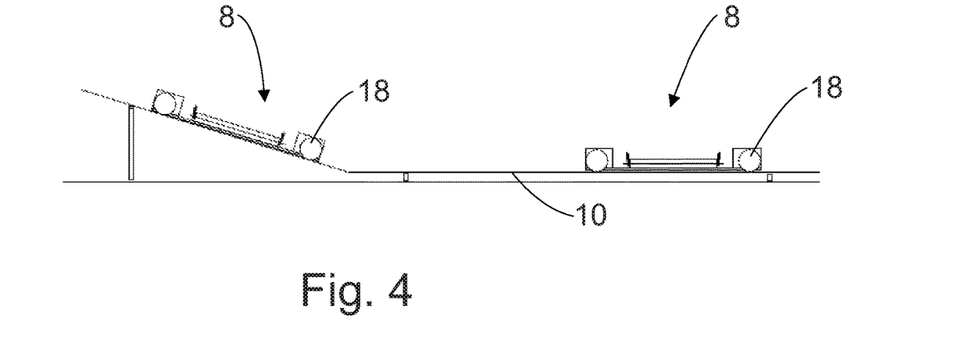
FIG. 4 shows side view of transport vehicles on an inclined and a horizontal surface.
Figure 5:
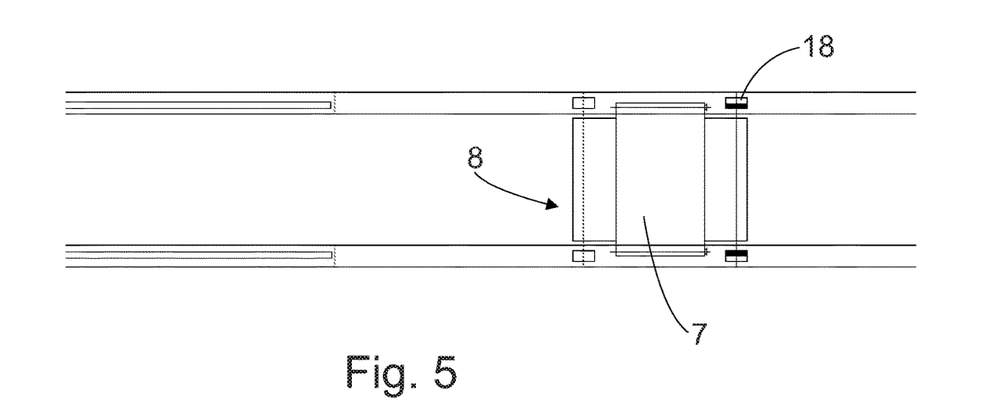
FIG. 5 shows a top view of the situation in FIG. 4 without showing the transport vehicle on the inclined surface.
Figure 6:
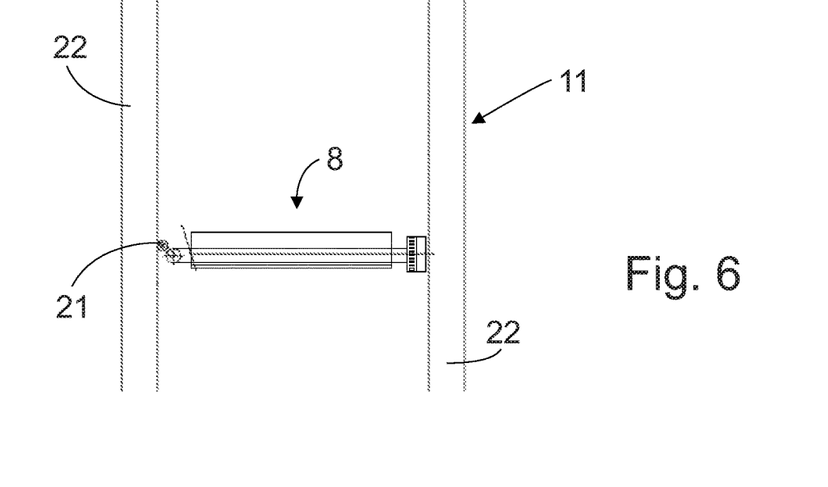
FIG. 6 illustrates a side view of a transport vehicle moving in the vertical direction between holding means.
Figure 7:
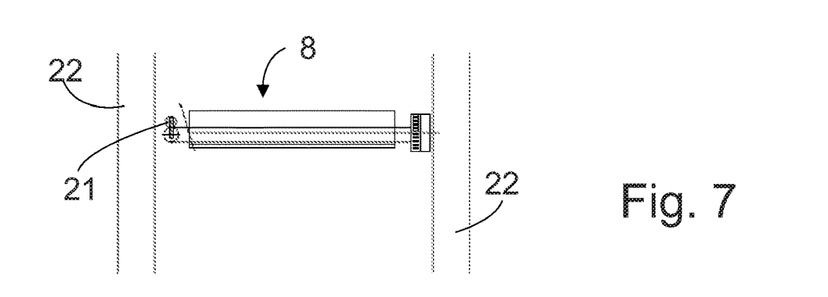
FIG. 7 shows another side view of a transport vehicle moving in the vertical direction between holding means.
Figure 8:
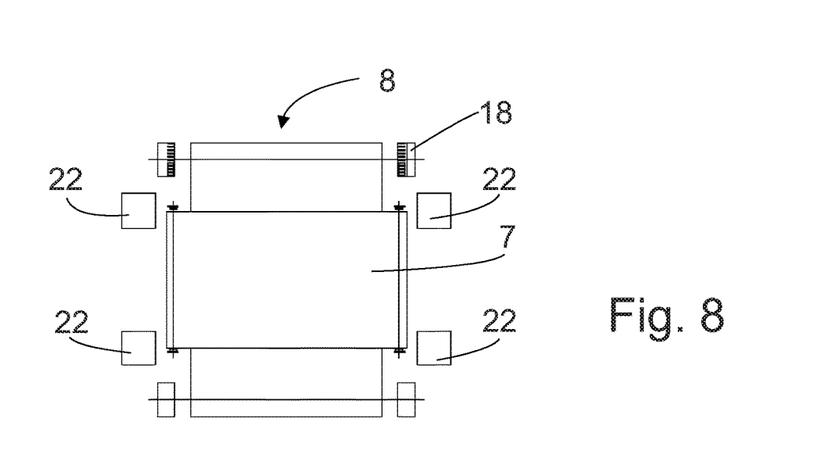
FIG. 8 shows a top view of the situation in FIG. 6

The storage shelf 5 is enlarged in both variants. In the suggestion according to the prior art, the rail system, for instance, on which the shelf storage and retrieval device runs, may be extended so that the one shelf storage and retrieval device may also service the larger storage shelf. At precisely this point it becomes clear that efficiency of the shelf storage and retrieval device is not scalable in the same manner as the enlargement of the storage shelf 5. It is true that a second shelf storage and retrieval device may be added to the existing rail system of the (first) shelf storage and retrieval device and used, so that the efficiency is raised again. However, these two systems are not as efficient as two systems that are separate from one another, since the two shelf storage and retrieval devices may not be used independently of one another. The problems continue when storage according to the prior art is enlarged: The first handling space at which the good is transferred from the shelf storage and retrieval device, for instance to an industrial truck, must be modified such that two shelf storage and retrieval devices may be delivered there.

In the suggestion according to the invention, the storage shelf 5 is enlarged in the same manner. The goods transport vehicle 8 is embodied such that it can travel both in the surface area, that is, between the storage shelf 5 and the station, and in the storage shelf 5 itself (to the height or diagonally). The expansion of the storage shelf 5 is associated with the condition that the goods transport vehicle 8 can reach, that is approach, each storage place 6. Since the goods transport vehicles 8 each run independently of one another and transport goods, expansion according to the invention is possible without any problem, the higher storage capacities are associated with a correspondingly higher transport capacity using a larger number of goods transport vehicles 8.

It is suggested according to the invention that at least one station and the storage shelf 5 are arranged adjacent to one another. Adjacent to one another here does not mean in a limiting manner horizontally adjacent to one another, but may also mean vertically adjacent to one another, that is, above one another, offset to one another, or in any other relative position to one another.

Moreover, it should be noted that the efficiency of the transport system according to the invention is scalable to the actual requirements of the storage system at any time. This flexibility is not provided in the prior art, since in the prior art both shelf storage and retrieval devices must always be moved in order to input or remove goods. If a lower number are to be handled in the suggestion according to the invention, the number of goods transport vehicles 8 is simply automatically reduced and is adjusted to the actual requirement. This flexible approach is sustainable and saves resources.

The invention comprises not only the advantageous embodiment of the storage system, as described, but also likewise a method for the erection or the expansion of a storage system, as the latter is described in particular in this application, wherein the storage system comprises at least one station, such as a goods input station 1, a goods relocation station, or a goods removal station 4, and a storage shelf 5 having a plurality of storage places 6 for storing goods, which storage places 6 are arranged adjacent to each other and/or one over the other, and comprises a storage control and, at least, on a part of the transport segment between the station and the storage place 6, transport segment elements having individual transport segment element identification means are arranged one after the other, and the arrangement of the individual transport segment elements relative to one another or after one another are stored in the storage control of the storage system by means of detecting the unique transport segment element identification means arranged on each transport segment element, and thus a planned path with path identification means is available in the storage control.

As described in the foregoing, the structural complexity for enlarging the storage system or the storage shelf 5 is not associated with a significant increase in the complexity of the transport systems. It does not matter to the goods transport vehicles 8 used whether they travel a smaller or larger storage shelf.

The inventive method thus comprises both the initial erection of a storage system and the subsequent expansion of an existing storage system. The procedures are ultimately identical, since the geometric allocation of the individual storage places 6 to one another change. Such a simple expansion of the storage system is not possible according to the suggestions described above for the prior art.

The initial existing or then expanded transport segment network is detected and learned by the storage control in a simple scanning procedure. The scanning procedure is to be performed such that the adjacently disposed transport segment elements are actually scanned with their transport segment element identification means in the given sequence, since the planned path is prepared from this relative information by the storage control.

The applicant reserves the right to use a divisional application to apply for independent protection for this part of the invention, which attains the aforesaid object in the same manner.

The suggested storage system according to the invention has the advantage, in particular, that when the storage shelf 5 is enlarged, the transport segment in the storage shelf is also enlarged simultaneously, which automatically ensures that a larger number of goods transport vehicles 8 are added that as a rule do not impede one another. Since the goods transport vehicles 8 are moved autarkically, that is, independently, among one another, the transport capacity and thus also the necessary handling number may be adapted or scaled to the requirements through a larger or smaller number of goods transport vehicles 8 used in the storage system.

It is known that the chain of transport systems according to the prior art is also vulnerable, since the transport genre provides the same efficiency with the lowest efficiency or with the lowest availability. In the worst case, failure of the (perhaps sole) shelf storage and retrieval device, for instance, may cripple the entire storage system according to the prior art. The failure of a (multiply redundant) goods transport vehicle 8 according to the invention, however, leads to a negligible fluctuation in performance, since the storage system detects the faulty goods transport vehicle 8 (sometimes in advance) and takes it out of operation, replacing it with a new, operational goods transport vehicle 8.

The embodiment of the guidance system is quite variable according to the invention. The guidance system is embodied, for instance, as a structurally visible element, such as is described for instance further below as a transport segment or transport segment element. At the same time, such an element represents a cost-effective variant for realizing the guidance system. However, the guidance system may also be formed as a navigation system, constructed on a radio basis, in which a number of transmitter stations are distributed in the storage system and permit locating, orientation, and guidance of the goods transport vehicles. In another variant of the guidance system, a guide track, for instance, is provided on the ground and is equipped with appropriate path identification means to permit orientation and guidance of the goods transport vehicles 8.

Moreover, it is advantageously provided in the suggestion that the storage system, especially the storage shelf 5, has, in addition to at least one essentially horizontally oriented transport segment 10, at least one inclined or vertically running transport segment 11, as well, and the goods transport vehicle 8 travels the transport segment. The storage shelf 5 is embodied such that the goods transport vehicle 8, coming from the station, moves directly into the storage shelf 5 and can travel therein to different stories or levels in order to reach even the upper storage places 6.

In one preferred embodiment of the suggestion, it is provided that the storage system has a storage control that exchanges information, preferably wirelessly, for instance via radio, WLAN, or bluetooth, with a storage place module that is arranged at the storage place 6 and/or via a goods transport vehicle control module that is arranged on the goods transport vehicle 8 and/or a transport segment element module that is arranged on the transport segment element. The inventive suggestion is extremely flexible. In the simplest variant, it is enough for the storage control of the storage system to exchange data only with the storage place module(s) (or only with the goods transport vehicle control module(s) or only with the transport segment element module(s)). Advantageously, each storage place 6 is equipped with such a storage place module. In more complex or convenient versions, the storage control communicates with a plurality of different modules, for instance with the storage place module (of each storage place 6), with the goods transport vehicle control module (of each goods transport vehicle 8), and with the transport segment element module (of each transport segment element).

In the context of this application, a functional group of a circuit or control or control circuit that does not necessarily have to be embodied as a differentiated, separate component or circuit part shall be understood to be a module or module element. Indeed, the selected term describes that the module or module element may be realized individually or in combination with other modules or module elements in the specific circuit, control, or control circuit. Due to the functional description of the module or module element, to the person skilled in the art it is clear how to embody and configure the module or module element. The suggested module or module element may thus also be stored for instance as software instructions in the control.

Moreover, it is provided that the storage control has at least one of the following module elements:
Module element that facilitates the correct or optimized sequence of a plurality of goods transport vehicles that transport at least one good for a common consignment to a station;
Module element for realizing rush orders;
An optimization module as a module element that optimizes the sequence of the goods that enter a station one after the other on goods transport vehicles 8, using transfer processes for transferring the goods to other stations and/or using the halting of a goods transport vehicle 8 in an overtaking and/or maneuvering region 13, wherein the optimization module is provided at least in part centrally in the storage control and/or at least in part decentrally in the specific goods transport vehicle control module of the goods transport vehicles 8.

The picking of consignments that comprise more than just one article is rendered significantly easier with the aforesaid first module element. The goal is for the goods transport vehicles 8 to transport the goods for one consignment process, to collect them just upstream of the station, and then simultaneously or one after the other at brief intervals to move into the station so that during the picking as many required goods from the consignment as possible are available.

During ordering processes, rush orders are often compensated with a surcharge. Since such orders must then be processed with priority, the second module element, which is equipped for realizing rush orders, is suggested. This is executed, for instance, such that such a rush order is realized on special goods transport vehicles 8 that can move in the storage system with priority. Thus, for instance, to this end reserved transport segments or routes may be provided, or, similar to the police or fire department, other goods transport vehicles must give way, that is, must yield the transport segment, when a goods transport vehicle 8 executing this rush order is underway. This type of situation is realized as follows: The storage control knows the segment portion of the transport segment on which the goods transport vehicle 8 is underway for the rush order. This segment portion is limited, for instance, by two path identification means. The storage control also knows which other goods transport vehicles 8 are disposed in this segment portion and these goods transport vehicles 8 that are traveling normally are then shifted to side routes, or maneuvered into the parking area or other spaces, and the rush order is thus assured clear travel.

The optimization module that is likewise optional and is advantageously provided reveals its advantages especially in the mechanical embodiment of the suggestion. Since the goods transport vehicle 8 itself may carry a conveying means 7, the goods transport vehicle 8 may decide itself when transferring or optimization is favorable, and may then, for instance, seek a free storage place 6 or station in order to create the desired sorting and sequence. This is variably executable since the goods transport vehicle 8 can off-load and re-load the goods itself. In this variant, for instance, the sequence of the goods may also be changed on the goods transport vehicle 8, but the suggestion according to the invention also includes the solution in which the goods transport vehicle 8 waits in the maneuvering region 13 until it, in coordination with other goods transport vehicles 8 in the correct series, in the correct sequence, enters the station for further picking. This optimization module is cleverly either at least a part of the (for instance centrally) embodied storage control or it is provided at least in part decentrally in the specific goods transport vehicle control module of the goods transport vehicle 8. The optimization module is therefore both an advantageous improvement in the storage control and, optionally, an optional improvement in the goods transport vehicle control module.

In one advantageous embodiment it is provided that the transport segment is formed modularly from a plurality of transport segment elements, arranged one after the other, and preferably embodied two-dimensionally, the transport segment element having in particular at least one rail guiding the goods transport vehicle 8. This is an example of the embodiment of the guidance system described above.

It is cleverly provided that each transport segment element is equipped with an individual transport segment element identification means that also acts as path identification means. Equipping each transport segment element with an individual transport segment element identification means makes it possible to address each transport segment element individually. In the inventive method, it is described how the storage system is constructed in a simple manner and learned by the storage control. First the transport segment element identification means acts as a unique identification means for the transport segment element if the latter is obstructed. If it is then configured, the transport segment element identification means obtains an additional function—that is, it becomes the path identification means, and thus a part of the path network or planned segment or planned path that is stored as data in the storage control.

In another preferred embodiment it is provided that the transport segment element is equipped with a transport segment element module that comprises at least one of the following module elements:

Module element that supports a wireless data connection to the storage control;

Module element that comprises a goods transport vehicle detection device that detects goods transport vehicle identification means arranged on the goods transport vehicle 8.

The latter module element permits it to determine where, that is, in which transport segment element, which goods transport vehicle 8 is at the time. Thus a goods transport vehicle 8 cannot be lost in the storage system and its current location is available.

Moreover, it is advantageously provided that a transport segment, in particular a transport segment running on an incline or vertically, or a transport segment element, is equipped with a friction-increasing surface and/or has regions with connecting elements that cooperate in a positive fit with at least one drive element of the goods transport vehicle 8. A toothed rack or the like is provided as a positive-fitting element, for instance. Using such an element it is possible to securely and reliably overcome even great inclines or vertical transport segment regions using the goods transport vehicle 8.

It is advantageously provided that the transport segment has at least one overtaking and/or maneuvering region 13 in order to modify or optimize the sequence of the series of goods transport vehicles 8 moving into a station. For a delivery process for one consignment, five goods, for example, are to be retrieved from the storage system, for which four goods transport vehicles 8 are used. Two different goods (from different storage places 6 in the storage system) are transported on one of these goods transport vehicles 8, at least one good, but possibly also a plurality of goods of the same genre, being transported on the other goods transport vehicles 8. Since the goods transport vehicles 8 may retrieve the goods for this consignment order from the storage shelf 5 at different times, they also meet at the goods picking station 3 at different times. This is a drawback, because then goods must be collected and parked there in the station. Therefore, an overtaking and/or maneuvering region 13 is provided in which the goods transport vehicles 8 that carry the goods for a consignment are collected and this train of goods transport vehicles 8 then travels together into the station when the goods for the consignment are complete.

In another preferred embodiment, it is provided that automatic transferring of the goods is provided in the overtaking and/or maneuvering range 13, likewise described as a station, which accelerates the picking process and also increases efficiency, since then the goods transport vehicles 8 that become free can take on new transport tasks.

Moreover, it is advantageously provided in the suggestion that the transport segment has at least one parking region in which goods transport vehicles 8 that are not currently needed or useable may be parked.

In one preferred embodiment of the suggestion it is provided that the transport segment element is embodied as a segment of a spiral. Arranging such spiral segments one after the other creates a spiral through which a goods transport vehicle 8 can travel from a first level to a higher or lower second level.

It is moreover provided that the goods transport vehicle 8 has a discrete drive. An electromotor is provided as a discrete drive, for example.

In one advantageous embodiment it is provided that the goods transport vehicle 8 is rail-mounted and/or non-rail-mounted. It is therefore provided, for example, that the transport segment element is equipped with one or two parallel rails.

A non-rail-mounted system may be realized, for example, by laying a guide track that thus forms the transport segment or the transport segment element. Disposed on the guide track are then also corresponding path identification means that make it possible for the goods transport vehicle 8 to orient itself. In this case, the goods transport vehicle 8 also carries a device that recognizes the guide track and that is equipped with a scanner or camera and in a suitable manner acts on or is connected to the control of the goods transport vehicle 8 in order to control the goods transport vehicle 8 so that it follows the guide track.

In one preferred embodiment it is also provided that arranged in the rail is the power line that supplies energy, that is, electrical current, to the goods transport vehicle via a current consumer provided on the goods transport vehicle 8.

The goods transport vehicle 8 is then cleverly provided with at least one current consumer that is able to cooperate with the current line provided on the rail.

It is cleverly provided that the goods transport vehicle 8 is equipped with a battery and another energy storage device 17 that is used for driving the goods transport vehicle 8. A charging station for the battery is cleverly provided in the parking region or at the station or in the overtaking and/or maneuvering region 13.

In another preferred embodiment it is provided that the goods transport vehicle is equipped with wheels 18, especially with drive wheels, at least some of these wheels 18 being provided with rolling surfaces having increased coefficients of friction. What such a provision attains is that the goods transport vehicles 8 can securely and reliably overcome inclines in the transport segment, wherein in particular, as already described, in the inclined regions of the transport segment these transport segment elements likewise have a friction-increasing coating in order to ensure secure and reliable operation of the goods transport vehicle 8.

Moreover, it is advantageously provided that the goods transport vehicle 8 has at least one drive element that may cooperate in a positive fit with the connecting elements from regions of the transport segment. For example, to this end a toothed wheel is provided that cooperates in the known manner with the toothed rack that is provided on the transport element and thus effects a positive-fit bond. Configured in such a manner, operation is significantly more certain, even with sharply inclined or vertical transport segment passages.

It is advantageously provided that the goods transport vehicle 8 has at least one holding element 21 that cooperates with holding means 22 provided on sharply inclined or vertically arranged transport segment elements. In this variant, the suggestion according to the invention also includes the possibility that the goods transport vehicle 8 moves vertically in the storage shelf 5. The goods transport vehicle 8 is appropriately equipped for this and then cooperates with corresponding holding means 22, for instance a guide rail, a guide profile, or a holding profile. At the same time, the holding element 21 and the holding means 22 may also be embodied such that a movement of the goods transport vehicle 8 is possible. Thus, for example, provided as holding means are one or two commonly driven toothed wheels that are equipped with support rollers and are supported on a holder profile that simultaneously also has a toothed rack function to permit positive-fit cooperation with the toothed wheel.

Moreover, it is advantageously provided in the suggestion that the goods transport vehicle 8 has a goods transport vehicle control module that comprises at least one of the following module elements:

Module element (a), which supports a wireless data connection to the storage control and/or to the goods transport vehicle control module, of at least one other goods transport vehicle;

Module element (b), which comprises a goods detection device that detects a goods identification means arranged on the good and that stores this goods identification means;

Module element that comprises a path segment detection device that detects path identification means arranged on the transport segment;

Module element that permits control of the drive and/or steering of the goods transport vehicle 8;

Module element (c), which finds or optimizes the path of the goods transport vehicle 8 on the path between two points in the storage system;

Module element (d), which monitors the functionality and usability of the goods transport vehicle 8, such as for instance the charging status of the battery or the energy consumption per segment;

Module element (e), which increases the goods per travel figure, and/or optimizes the travel segment when carrying out a delivery order, especially when goods for a plurality of orders are transported during one travel, this module element cooperating in particular with the preceding module element for finding the path;

Module element that correctly sequences or optimizes the sequencing of a plurality of goods transport vehicles 8 that transport at least one good for a common consignment to a station;

Module element that comprises a goods memory in which at least one piece of goods information may be stored and the module element optimizes the storage operation;

Using the aforesaid module elements, the essential data for the good are detected and the module may employ this information for optimizing the storage operation. One piece of goods information is the expiration date, for instance. Goods with approaching expiration dates are input in the forward region of the storage shelf so that they are rapidly available. Moreover, it is also provided, for instance, that goods having the same expiration date are not stored at the same storage place, which improves availability;

An optimization module as module element that optimizes the sequence of the goods that enter a station one after the other on goods transport vehicles 8, using transferring processes for the goods at other stations and/or stopping a goods transport vehicle in an overtaking and/or maneuvering region 13, the optimization module being provided at least in part centrally in the storage control and/or at least in part decentrally in the specific goods transport vehicle control module of the goods transport vehicles. The advantages of the optimization module were already addressed above.

Communication with the storage control and/or other goods transport vehicles 8 is possible using the module element a.

What the module element b attains is that the goods transport vehicle control module independently detects the transported good and then, for instance, may retrieve information about it in the storage lists (via the storage control).

The path detection device has a receiver or a configuration that cooperates with the path identification means used, i.e., can detect and read out the path identification means.

All geometric locations that can be described by a path identification means, for instance, are identified as points in the storage system and may be, for instance, intersections of transport segments, switch points in the transport segment, the stations, storage places, etc. The module element c also uses the circumstance that in some cases a plurality of paths is possible between two points in the storage system. The module detects the traffic on the individual transport segments and may then independently decide the path via which the objective is to be reached.

If the module element d detects limited functionalities or usability of the goods transport vehicle 8 (for instance, the battery voltage is too low and recharging is advisable), this goods transport vehicle 8 declines further transport tasks and travels to a parking region to undergo maintenance.

In the simplest transport task, the goods transport vehicle 8 receives the order to transport a special good from the storage shelf 5 to a station. In this case, the good is per trip identifier 1. Such a trip is not very efficient! An improvement in, that is, an increase in, this identifier is attained in that, using module element e, additional delivery orders are sought for an existing delivery order, and these additional delivery orders either require the same goods, and if such delivery orders exist, then a larger number of the same goods are transported to the picking region or picking station 3. Alternatively, it is possible for goods that are for the same or for other orders and that are "on the way" to be taken along.

In one preferred embodiment of the suggestion, it is provided that an individual goods transport vehicle identification means is allocated to each goods transport vehicle 8. Because of this each goods transport vehicle 8 is uniquely addressable and detectable.

Moreover, it is provided that the goods transport vehicle 8 is equipped with a conveying means 7, such as for instance a conveyor belt or roller conveyor drivable by a drive, for inputting and removing the good provided on the goods transport vehicle 8. This configuration permits automatic loading and unloading of the goods transport vehicle 8 with the good, specifically both at the storage place 6 and in the station.

In one advantageous embodiment it is provided that the conveying means 7 is embodied such that a discharge of the good transported on the goods transport vehicle 8 occurs at the station while traveling past without the goods transport vehicle 8 stopping. This advantageous variant saves time, since the goods transport vehicle 8 does not first have to be braked for the transfer of the good and then have to be accelerated. The goods transport vehicle control module cleverly detects the mass of the transported good and may then determine the optimum ejection force so that the ejection movement is also always as similar as possible for different goods. For instance, a scale is disposed in the region of the station and weighs the good when it is input, or the weight or the mass is stored as goods information, or the goods transport vehicle 8 is equipped with a scale that travels with it.

It is cleverly provided that the goods transport vehicle 8 is equipped with an energy output means or overdrive, for instance a driven shaft or a driven gear or an output drive gear, that may be mechanically connected to an energy connection point on the conveying means of the storage place 6 or of the station and that is driven in particular with the drive of the conveying means 7 of the goods transport vehicle 8. What this configuration achieves is that no active (and also expensive) drives that are difficult to maintain have to be provided at the storage places 6. Such drives are required only seldom, specifically only when a good is input or removed. Thus it is very advantageous to provide an energy output means or an overdrive, as described, that may when needed be used to supply movement energy to the storage place 6 in order to input or remove the good.

It is advantageously provided that a conveying means 7, such as for instance a conveyor belt or a roller conveyor, is provided at at least one storage place 6 of the storage shelf 5 or of a station, or, alternatively, that sliding elements onto which the good is pushed or from which the good is removed are arranged at at least one storage place 6 of the storage shelf 5.

Moreover, it is advantageously provided in the suggestion that a discrete drive, for instance an electromotor, is provided for the conveying means 7 at the storage place 6 or station and/or that the conveying means has an energy connection point, such as for instance a connector socket, a drive journal, or a drive wheel, that may be mechanically connected in particular to an energy output means provided on the goods transport vehicle 8. It is clear that exchanging a plug with a connector socket for a connector socket with a plug is to be construed as equivalent means in the context of this invention.

It is cleverly provided that the shelf has a shelf depth that is deep enough to form at least one storage place row of two storage places 6 behind one another. Since it is provided according to the invention that the storage place 6 may also have a conveying means. Cleverly, the shelf may have a shelf depth that contains a plurality of goods behind one another and thus makes available a plurality (at least two) storage places 6, a storage place row. Even goods that are farther back may be conveyed onto the goods transport vehicle by the provided conveying means 7 when needed.

In one advantageous embodiment it is provided that the shelf, especially the storage place row, may be accessed from two sides. This redundant embodiment permits the various storage places to be accessed effectively.

It is advantageously provided that a common conveying means is provided for all storage places of the storage place row, or the storage place row has a plurality of conveying means, where necessary coupled to one another.

In another preferred embodiment it is provided that the goods transport vehicle 8 is equipped with at least one control and storage module, in particular with an industry PC that comprises in particular the goods transport vehicle control module.

Moreover, it is advantageously provided that at least one goods transport vehicle 8 is equipped with a tow-bar coupling and with a towing control module. If a goods transport vehicle 8 breaks down, it is towed by another goods transport vehicle 8 that is equipped with a tow-bar coupling. The towing process itself runs automatically and is monitored by the towing control module. The towing control module monitors the coupling process and also limits the maximum speed of such an assembly. A goods transport vehicle 8 that has broken down transmits a corresponding status message to the storage control, which then sends a goods transport vehicle 8 that has this towing function to the goods transport vehicle 8 that has broken down.

In one preferred embodiment of the suggestion, it is provided that the storage control controls the number of goods transport vehicles 8 used in the system, especially based at least on one of the following pieces of information:

The number of goods input and/or goods removal processes, in particular per unit of time, The number of goods transport vehicles 8 in a special storage shelf 5 region.

What this suggestion achieves is that an adequate number of goods transport vehicles 8, but not too many, are always available. This permits an efficient, and especially resource-conserving, workload to be attained at the same time as high availability and rapid reaction time of the storage system when orders are being assembled.

The storage system is also able to monitor the number of goods transport vehicles 8 in a special shelf storage region, since it can determine which specific individual goods transport vehicles 8 are disposed between two path identification means (a segment region or storage shelf region) and can then react accordingly, if the density of goods transport vehicles 8 is too high, because obstructions can easily occur when the number of vehicles per storage shelf region is too high.

Moreover, it is provided that the storage place 6 or the station is equipped with a storage place module or a station module that comprises at least one of the following module elements:

Module element that supports a wireless data connection to the storage control;

Module element that comprises a goods detection device that detects an identification means arranged on the good and stores this goods identification means;

Module element that comprises a goods transport vehicle detection device that detects a goods transport vehicle identification means arranged on the goods transport vehicle.

In one advantageous embodiment it is provided that provided at each storage place 6 or each station is an individual storage place identification means or station identification means that in particular is connected to or can cooperate with the storage place module or station module. Such an individual storage place identification means or station identification means ultimately has the same properties and also tasks as a path identification means. It is part of the planned path and orients the goods transport vehicles 8, which automatically detect this identification means and compare to their electronic map.

It is cleverly provided that the goods transport vehicle 8 reaches each storage place 6 in the storage shelf 5 via the transport segment.

In another preferred embodiment, it is provided that the storage shelf comprises a frame 12 for accommodating and storing the transport segment elements.

Moreover it is advantageously provided that the transport segment element identification means and/or the goods transport vehicle identification means and/or the path identification means and/or the goods transport vehicle identification means are embodied as active identification means, such as for instance an RFID element or as a passive identification means, such as for instance a QR or barcode. Naturally the various detection apparatus are configured such that they are able to detect the identification means used, wherein then the situation is also stored and further processed by the specific control module.

In this context it should especially be noted that all of the features and properties described with reference to the storage system, but also the procedures, may also be applied analogously with respect to the formulation of the inventive method and may be used in the context of the invention and are also considered disclosed. The same applies in reverse, meaning that structural or apparatus features cited only with reference to the method may also be considered and claimed in the context of the claims for the storage system and are also included in the disclosure.

In the context of this application, the various controls were described with a plurality of functionalities of different modules or module elements, wherein these described functionalities may explicitly be carried over to all of the other circuits and controls mentioned in this application (and where necessary also to others) and are considered included in the disclosure.

The claims submitted with the application now and later are without prejudice for attaining further protection.

If, upon closer inspection, especially of the pertinent prior art, it should be found that one or another feature is indeed advantageous for the objective of the invention, but is not of critical importance, of course a formulation is already now sought that no longer has such a feature, especially in the main claim. Such a subordinate combination is also covered by the disclosure of this application.

It should furthermore be noted that the embodiments and variants of the invention illustrated in the various embodiments and in the figures may be combined with one another in any manner. Individual or multiple features may be exchanged for one another in any manner. These feature combinations are also disclosed.

The back-references provided in the dependent claims suggest the further refinement of the subject matter of the main claim using the features of the specific subordinate claim. However, these shall not be understood to abandon the attainment of independent protection for the features of the subordinate claims referred to.

Features that were only disclosed in the description or individual features from claims that comprise a plurality of features may at any time be added to the independent claim/claims as essential to the invention for delimiting from the prior art if such features were mentioned in connection with other features or in connection with other features attain particularly favorable results.

NUMBER REFERENCE

1 goods input station
3 goods picking station
4 goods removal station
5 storage shelf
6 storage place
7 conveying means
8 transport vehicle
10 horizontally orientated transport segment
11 vertically running transport segment
12 frame
13 overtaking and/or maneuvering region
17 energy storage device
18 wheel
21 holding element
22 holding means

The invention claimed is:

1. A storage system comprising:
at least one station, and a storage shelf, which has a plurality of storage places for storing goods, which storage places are arranged adjacent to each other and/or one over the other, the transport system comprising at least one goods transport vehicle that transports at least one good from the station to one of the storage places or from one of the storage places to the station, and the transport occurs free of the good being transferred onto another goods transport vehicle, the station and storage shelf being arranged adjacent to one another and the goods transport vehicle for the transport of the good moving both in an essentially horizontally oriented region between the station and the storage shelf, and in the storage shelf, diagonally or vertically, and the goods transport vehicle being equipped with a conveying mechanism for delivering or removing the good provided or providable on the goods transport vehicle, and the good remaining on the conveying mechanism during the transport, and a conveying mechanism being provided at at least one storage place of the storage shelf or of a station, and the goods transport vehicle being equipped with an energy output mechanism or overdrive that is arranged to be mechanically connected to an energy connection point on the conveying mechanism of the storage place or of the station, and that is arranged to be driven with the drive or the energy source of the conveying mechanism of the goods transport vehicle and the storage shelf, has, in addition to at least one essentially horizontally oriented transport segment, at least one inclined or vertically running transport segment, as well, and the goods transport vehicle travels the transport segment wherein it is provided that the storage shelf comprises a frame for accommodating and storing the transport segment elements and wherein the shelf comprises a storage place row of at least two storage places behind one another containing a plurality of goods behind one another and the storage place row can be accessed from two sides, wherein a common conveying means is provided for all storage places of the storage place row and wherein the goods transport vehicle has a goods transport vehicle control module that comprises a module element that comprises a goods detection device that detects a goods identification arranged on the good and that stores this goods identification and a module element that comprises a goods memory in which at least one piece of goods information is stored and the module element optimizes the storage operation.

2. The storage system according to claim 1, wherein the storage system has a storage control that exchanges information with a storage place module that is arranged at the storage place and/or via a goods transport vehicle control module that is arranged on the goods transport vehicle and/or a transport segment element module that is arranged on the transport segment element.

3. The storage system according to claim 1, wherein a transport segment is equipped with a friction-increasing surface and/or has regions with connecting elements that cooperate in a positive fit with the at least one drive element of the goods transport vehicle.

4. The storage system according to claim 2, wherein the storage control has at least one of the following module elements, comprising:
   (a) a module element that facilitates a correct or an optimized sequence of a plurality of goods transport vehicles that transport at least one good for a common consignment to a station;
   (b) a module element for realizing rush orders; or
   (c) an optimization module that optimizes a sequence of the goods that enter a station one after the other on goods transport vehicles, using transfer processes for transferring the goods to other stations and/or using the halting of a goods transport vehicle in an overtaking and/or maneuvering region, wherein the optimization module is provided at least in part centrally in the storage control and/or at least in part decentrally in the specific goods transport vehicle control module of the goods transport vehicles.

5. The storage system according to claim 1, wherein the goods transport vehicle is rail-mounted and/or non-rail-mounted.

6. The storage system according to claim 1, wherein the goods transport vehicle is equipped with a battery or another energy storage device that is used for driving the goods transport vehicle and/or the goods transport vehicle is equipped with wheels, especially with drive wheels, at least some of these wheels being provided with rolling surfaces having increased coefficients of friction or having positive fit elements.

7. The storage system according to claim 1, wherein the goods transport vehicle has at least one drive element arranged to cooperate in a positive fit with connecting elements from regions of the transport segment and/or the goods transport vehicle has at least one holding element that cooperates with a holding mechanism provided on sharply inclined or vertically arranged transport segment elements.

8. The storage system according to claim 1, wherein the goods transport vehicle is equipped with at least one current consumer that can cooperate with a power line provided on a rail and/or at least one goods transport vehicle is equipped with a tow-bar coupling and a towing control module.

9. The storage system according to claim 2, wherein the goods transport vehicle has a goods transport vehicle control module that comprises at least one of the following module elements, comprising:
   (a) a module element that supports a wireless data connection to the storage control and/or to the goods transport vehicle control module, of at least one other goods transport vehicle;
   (b) a module element that comprises a path segment detection device that detects path identification arranged on the transport segment;
   (c) a module element that permits control of the drive and/or steering of the goods transport vehicle;
   (d) a module element that finds or optimizes a path of the goods transport vehicle on the path between two points in the storage system;
   (e) a module element that monitors functionality and usability of the goods transport vehicle;
   (f) a module element that monitors at least one of a charging status of a battery or energy consumption per segment;
   (g) a module element that increases a goods per travel figure, and/or optimizes a travel segment when carrying out a delivery order;
   (h) a module element that optimizes a travel segment when goods for a plurality of orders are transported during one travel, this module element cooperating with module element (e) for finding the path;
   (i) a module element that correctly sequences or optimizes a sequencing of a plurality of goods transport vehicles that transport at least one good for a common consignment to a station; or
   (j) an optimization module as module element that optimizes the sequence of goods that enter a station one after the other on goods transport vehicles, using transferring processes for the goods at other stations and/or stopping a goods transport vehicle in an overtaking and/or maneuvering region, the optimization module being provided at least in part centrally in the storage control and/or at least in part decentrally in a specific goods transport vehicle control module of the goods transport vehicles.

10. The storage system according to claim 1, wherein the conveying mechanism is arranged so that a discharge of a good transported on the goods transport vehicle occurs at the station while traveling past free of stopping by the goods transport vehicle.

11. The storage system according to claim 1, wherein a discrete drive is provided for the conveying mechanism at the storage place or the station and/or the conveying mechanism has an energy connection point arranged to be mechanically connected to an energy output mechanism provided on the goods transport vehicle.

12. The storage system according to claim 1, wherein the shelf has a shelf depth that is deep enough to form at least one storage place row of two storage places behind one another and/or the shelf.

13. The storage system according to claim 12, wherein a common conveying mechanism is provided for all storage places of the storage place row, or the storage place row has a plurality of conveying mechanisms, and/or the storage shelf comprises a frame for accommodating and storing transport segment elements.

14. A storage system, comprising:
   at least one station;
   a storage shelf having a plurality of storage places for storing goods, the storage places being arranged adjacent to each other and/or one over the other, the at least one station and the storage shelf being arranged adjacent to one another;

at least one goods transport vehicle that transports the good: a) from the at least one station to one of the plurality of storage places, or b) from one of the storage places to the station, wherein the transport occurs free of the good being transferred onto another goods transport vehicle, wherein the goods transport vehicle is configured to move both in an essentially horizontally oriented region between the at least one station and the storage shelf, and diagonally or vertically in the storage shelf, the goods transport vehicle being equipped with a conveying mechanism for delivering or removing the good provided or providable on the goods transport vehicle, and the good remaining on the conveying mechanism during the transport, and the conveying mechanism being provided at at least one storage place of the storage shelf or of at least one station, and the goods transport vehicle being equipped with an energy output mechanism or overdrive that is arranged to be mechanically connected to an energy connection point on the conveying mechanism of the storage place or of the station, and that is arranged to be driven with the drive or the energy source of the conveying mechanism of the goods transport vehicle, wherein the storage shelf comprises at least one essentially horizontally oriented transport segment and at least one inclined or vertically running transport segment, and the goods transport vehicle travels the at least one essentially horizontal oriented transport segment and the at least one inclined or vertically running transport segment, wherein the storage shelf comprises a frame for accommodating and storing transport segment elements, wherein the storage shelf comprises a storage place row of at least two storage places behind one another containing a plurality of goods behind one another, the storage place row being accessible from two sides;

a common conveying means for all storage places of the storage place row; and wherein the goods transport vehicle comprises a goods transport vehicle control module that comprises a first module element that comprises a goods detection device that detects a goods identification arranged on the good and that stores the goods identification and a second module element that comprises a goods memory in which at least one piece of goods information is stored.

* * * * *